United States Patent Office 3,120,797
Patented Feb. 11, 1964

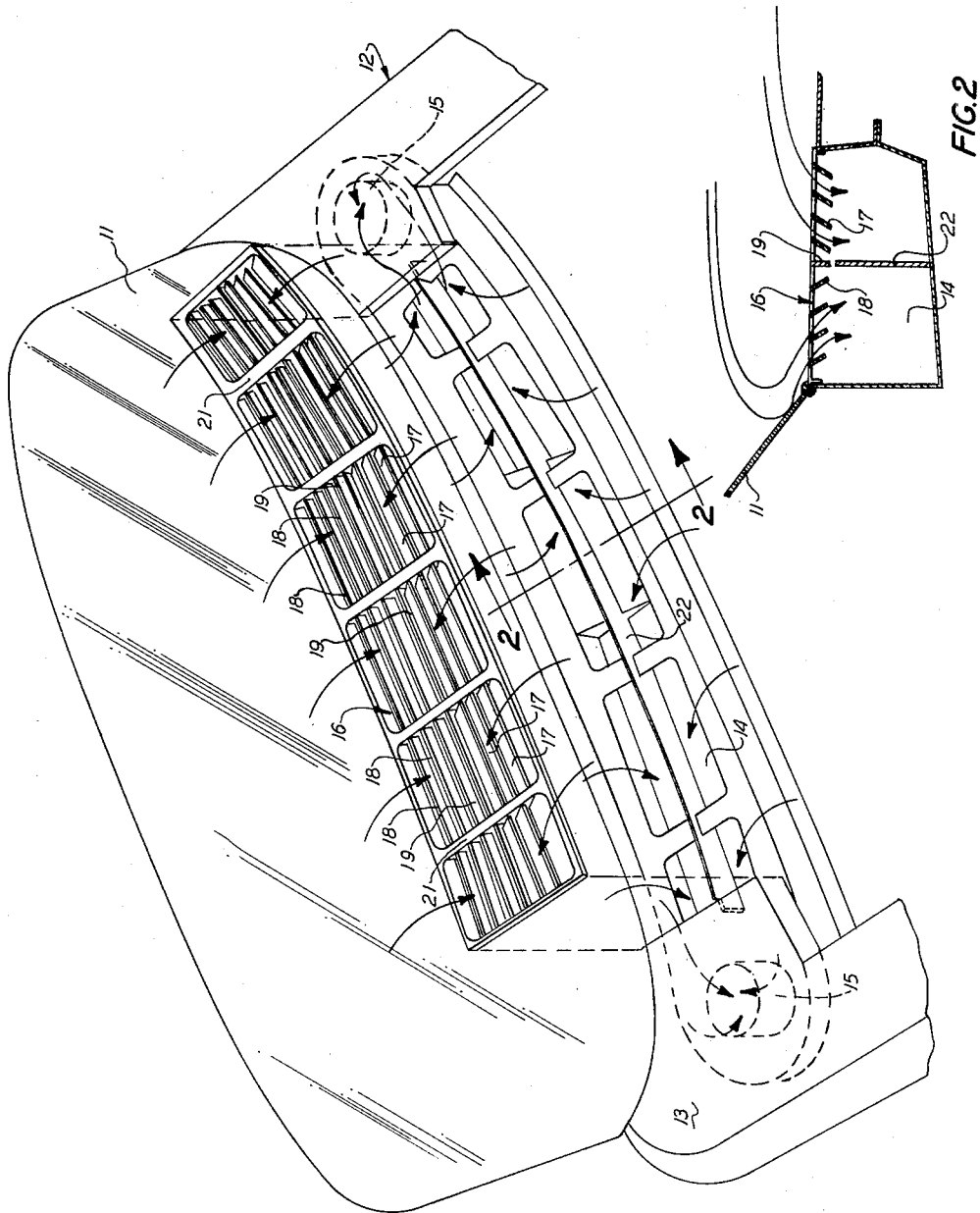

3,120,797
VEHICLE VENTILATION SYSTEM
Gerald E. Beyer, Lathrup Village, Mich., assignor to Ford Motor Company, Dearborn, Mich., a corporation of Delaware
Filed June 6, 1960, Ser. No. 34,153
4 Claims. (Cl. 98—2)

This invention relates to vehicle ventilation systems.

In many vehicular ventilation systems, fresh air is drawn into the vehicle body through an air intake plenum chamber located in the body cowl structure. The incoming fresh air enters the plenum chamber through an elongated grille which lies in the general plane of the vehicle hood and cowl surface and extends a substantial distance across the width of the vehicle body.

Ventilation systems having cowl located air intake openings have at least two important advantages over those systems which draw fresh air through ducts provided with air intake openings at the front of the vehicle. First, the cowl located air intake minimizes the amount of noxious exhaust gases likely to be drawn into the vehicle under slow moving or heavy traffic conditions. Second, the intake air is substantially cooler since it does not have to pass through ducts subject to the ambient heat of the hot engine compartment. The major disadvantage of the cowl air intake opening location, particularly when the intake grille is mounted flush with the hood and cowl surface, is the relatively low air intake efficiency. A substantial portion of the ram effect obtainable with front opening air ducts is lost. Also, a certain amount of air flow turbulence is created over the intake grille as the air stream flowing over the hood impinges on the vehicle windshield.

It is an object of the present invention to provide a strategically positioned baffle within the plenum chamber and to further provide an improved grille structure, both of which coact to improve the air intake efficiency of cowl located air intake systems.

In its preferred embodiment, the present invention is applied to a vehicle body having a fixed windshield and a cowl structure extending forwardly therefrom. An elongated air intake plenum chamber having at least one air discharge outlet extends across the width of the vehicle beneath the surface of the cowl structure. The plenum chamber is separated by a baffle into two longitudinally extending subchambers. The cowl structure is provided with an air inlet opening leading to the plenum chamber and the air inlet opening has a grille positioned therein. The grille has a first set of directional vanes constructed and arranged to intercept a portion of an air stream flowing over the cowl structure and to direct this portion of the air stream into one of the subchambers. The grille also has a second set of directional vanes constructed and arranged to intercept a further portion of the air stream after deflection of the latter by said windshield and to direct this further portion into the other of the plenum chamber subchambers. The baffle that divides the plenum chamber into the two subchambers functions to prevent any intermixture of the two air stream portions as they flow toward the plenum chamber discharge outlet. Without the baffle, the two air stream portions entering the plenum chamber from opposite directions would intermix thereby creating a turbulent condition and reducing the efficiency of the air flow through the plenum chamber.

Other objects, advantages and features of the present invention will be made more apparent as the description proceeds, particularly when considered in connection with the accompanying drawings, wherein:

FIG. 1 is a fragmentary exploded perspective view illustrating the construction and arrangement of the grille and the location of the baffle within the cowl air intake plenum chamber; and FIG. 2 is a semidiagrammatic view illustrating the air flow pattern achieved by the structure embodying the present invention.

Referring now to the drawings, there is indicated at 11 the upwardly and rearwardly extending windshield of a vehicle body 12. The portion 13 of the vehicle body directly forward of the windshield is generally referred to as the cowl structure.

Fresh air for the vehicle ventilation system is supplied through an elongated plenum chamber 14 located beneath the upper surface of the cowl structure 13 and extending substantially across the width of the vehicle body 12. The plenum chamber 14 connects to the passenger compartment through two air vent outlets 15 on either side of the body. Incoming fresh air enters the plenum chamber 14 through a grille 16 which extends for a substantial distance across the width of the vehicle body.

The foregoing construction and arrangement follows conventional practice. It will be noted that the grille 16 is illustrated (see FIG. 2) as lying flush with the upper surface of the hood and cowl structures. In such conventional constructions the grille 16 may be provided with a screen or other protective means to prevent objects from falling into the plenum chamber. The screen or other protective structure are not intended to influence the manner in which air enters the plenum chamber. Because of the flush relationship of the grille, there is very little ram effect forcing air into the intake plenum chamber. Because of the aversion of vehicle stylists to upwardly extending protuberances which break the continuity of the hood lines, the flush mounting of the grille has been adopted despite its relative inefficiency.

In the improved construction and arrangement embodying the present invention, the grille 16 is provided with two sets of directional vanes 17 and 18, respectively, extending parallel to the longitudinal axis of the grille. The vanes 17 are rearwardly declined, i.e., they are tilted rearwardly relative to the surface plane of the grille. The vanes 18 are forwardly declined. The two sets of vanes are separated by a vertically depending or neutral vane 19. The grille 16 is shown divided into sections by ribs 21 which are provided for structural reinforcement. The grille 16 may be divided into as many sections as desired. In addition, the plenum chamber 14 which is substantially rectangular in cross section (see FIG. 2), is provided with a center baffle 22. The baffle 22 extends longitudinally within the plenum chamber for a distance substantially equal to the length of the grille.

The operation of the improved construction and arrangement is relatively simple. The baffle 22 creates a double acting plenum, enabling the air from the front of the vehicle entering through the directional vanes 17 and the air that deflects from the windshield entering through the directional vanes 18 to enter the plenum chamber with improved laminar flow characteristics. Normally, the air being deflected from the windshield creates a turbulence over the grille structure interfering with the air that is attempting to enter the grille from the front of the vehicle. The forwardly declined directional vanes 18 capture a substantial portion of the air stream which normally would create such turbulence. Although air is now entering the plenum chamber from two directions, that is, from the leading and trailing sides of the grille, the baffle 22 located below the neutral vane 19 prevents any internal disturbance between the two air streams. Each air stream follows a separate path toward the air vent outlets 15.

The increased air intake efficiency created by the use of the improved grille structure and the strategically placed baffle permits a greater amount of air to be provided to the vehicle compartment or, if the amount of air already being provided is sufficient, permits the use of a smaller plenum chamber and grille. This latter consideration is of some importance, since one of the problems in designing vehicle bodies is the provision of suitable space for the various components mounted beneath and within the cowl structure.

It will be understood that the invention is not to be limited to the exact construction shown and described, but that various changes and modifications may be made without departing from the spirit and scope of the invention, as defined in the appended claims.

I claim:

1. In a vehicle body having a fixed windshield and a cowl structure extending forwardly therefrom,
   an elongated air intake plenum chamber extending across the width of said vehicle body beneath the surface of said cowl structure and having at least one discharge outlet,
   a baffle separating said plenum chamber into two longitudinally extending subchambers,
   an air inlet opening in said cowl structure leading to said plenum chamber,
   and a grille positioned in said opening having
      (1) a first set of directional vanes constructed and arranged to intercept a portion of an air stream flowing over said cowl structure and to direct said portion into one of said subchambers, and
      (2) a second set of directional vanes constructed and arranged to intercept a further portion of said air stream after deflection of the latter by said windshield and to direct said further portion into the other of said subchambers,
   said baffle preventing a turbulence creating intermixture of said air stream portions as they flow toward said plenum chamber discharge outlet.

2. In a vehicle body according to claim 1 in which said baffle extends in a direction substantially normal to the surface of said grille,
   and in which said first and second sets of directional vanes are separated by a vane depending from the surface of said grille in substantially coplanar relationship to said baffle.

3. In a vehicle body according to claim 1 in which said first set of directional vanes comprises a plurality of spaced, rearwardly declined vanes, and
   in which said second set of directional vanes comprises a plurality of spaced, forwardly declined vanes,
   both sets of vanes being in substantially parallel relation to said baffle.

4. In a vehicle body according to claim 3 in which said baffle extends in a direction substantially normal to the surface of said grille,
   and in which said first and second sets of directional vanes are separated by a vane depending from the surface of said grille in substantially coplanar relationship to said baffle.

References Cited in the file of this patent

UNITED STATES PATENTS

| | | |
|---|---|---|
| 1,633,093 | Gurney | June 21, 1927 |
| 2,738,718 | Reynolds | Mar. 20, 1956 |
| 2,821,894 | Baubein | Feb. 4, 1958 |
| 2,836,113 | Seyfarth | May 27, 1958 |
| 2,852,997 | Leslie et al. | Sept. 23, 1958 |
| 2,975,696 | Jewell | Mar. 21, 1961 |